United States Patent [19]

Friesen et al.

[11] Patent Number: 5,366,336

[45] Date of Patent: Nov. 22, 1994

[54] LEVELING ROD ASSEMBLY COUPLED BETWEEN TOWED IMPLEMENT HITCH AND GROUND WHEEL AXLE

[75] Inventors: Henry Friesen, Niagara Falls; Karl H. Friesen, Niagara-on-the-Lake, both of Canada

[73] Assignee: Deere & Company, Moline, Ill.

[21] Appl. No.: 75,437

[22] Filed: Jun. 14, 1993

[51] Int. Cl.⁵ .............................................. A01B 63/00
[52] U.S. Cl. ................................... 414/476; 172/328; 280/414.5; 56/17.2
[58] Field of Search ............... 414/469, 474, 476, 481, 414/482, 483, 495; 172/326, 327, 328; 280/414.5; 56/15.8, 17.1, 17.2, DIG. 10

[56] References Cited

U.S. PATENT DOCUMENTS

| | | | |
|---|---|---|---|
| 2,717,479 | 9/1955 | Scheidenhelm et al. | 172/328 |
| 3,777,823 | 12/1973 | Holfeld | 172/328 |
| 3,837,665 | 9/1974 | Schramm | 414/476 X |
| 4,108,249 | 8/1978 | Anderson et al. | 172/328 |
| 4,326,594 | 4/1982 | Oka et al. | 172/328 |
| 4,869,057 | 9/1989 | Siegrist | 56/15.8 X |

OTHER PUBLICATIONS

Bush Hog Operator's Manual (undated but published prior to Jun. 1992), front and back cover pages plus pp. 12 & 13.

Deere & Company Operator's Manual OMW40678 Issue C2, published Feb. 5, 1992, cover page and p. 35-39, published in U.S.A.

Primary Examiner—Michael S. Huppert
Assistant Examiner—James Eller

[57] ABSTRACT

A towed rotary cutter has a main frame defined by the cutter housing supported at its rear by ground wheels that are coupled to the frame through means of a pivotably mounted axle. A hitch is pivotally mounted at the front end of the frame and carries a clevis assembly at the forward end thereof. A pair of parallel, transversely spaced leveling rods extend between the hitch and wheel axle with the rear ends of the rods being defined by eyes that are received on respective pins formed integrally with the opposite ends of a cylindrical equalizer bar that is pivotally mounted to the axle. These pins are radially spaced in opposite directions from the pivot axis of the equalizer bar. The forward ends of the leveling rods are pivotally coupled to the hitch with one of the rods including an adjustment for changing its effective length extending between the axle and hitch.

6 Claims, 3 Drawing Sheets

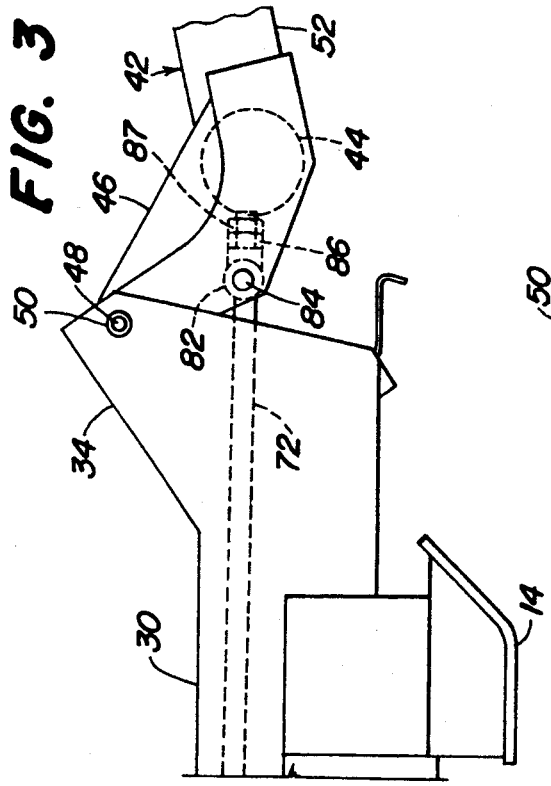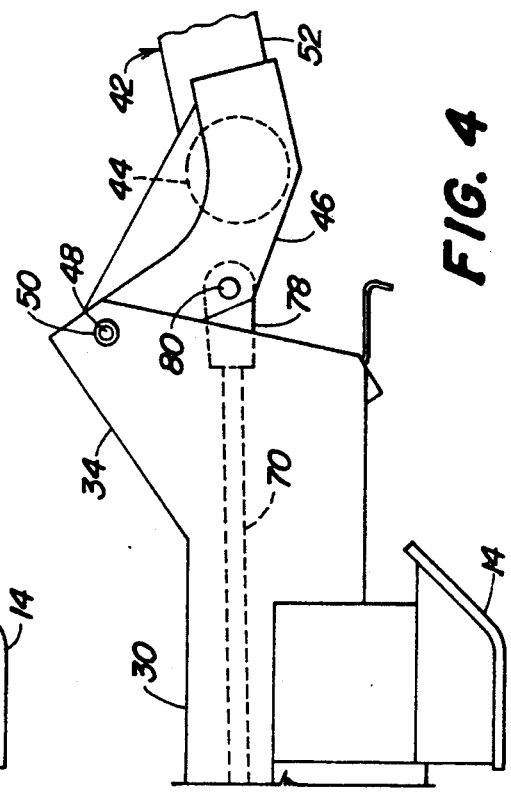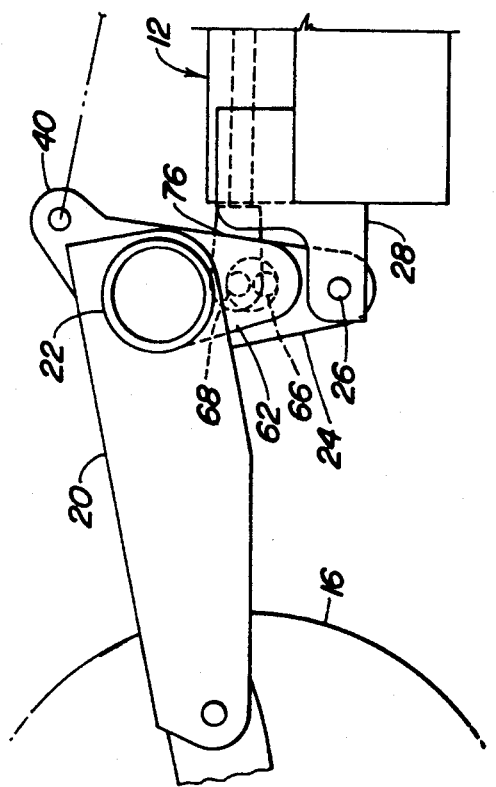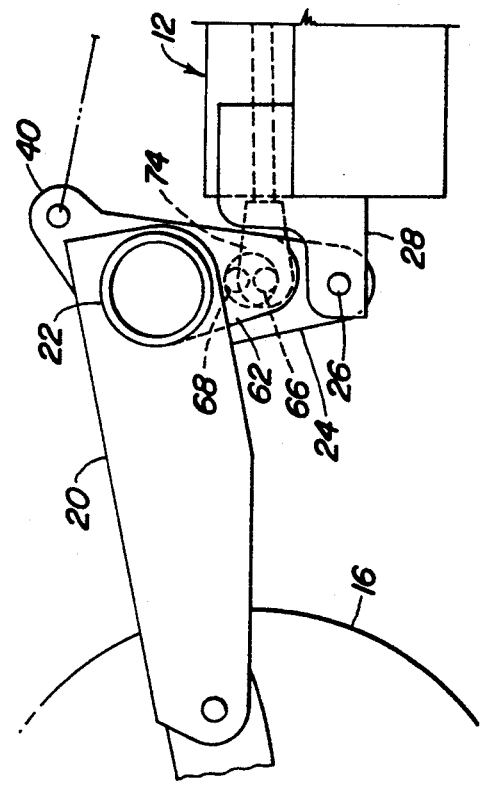

LEVELING ROD ASSEMBLY COUPLED BETWEEN TOWED IMPLEMENT HITCH AND GROUND WHEEL AXLE

BACKGROUND OF THE INVENTION

The present invention relates to leveling assemblies coupled between the hitch and ground wheels of a towed implement and more particularly relates to those assemblies using a pair of leveling rods.

Towed implements may include working elements or tools which have their operating position relative to ground level adjusted by swinging ground wheels to selected vertical positions relative to the supporting frame of the wheels. It is often desirable to keep these working elements or tools in a level disposition for all working heights of the implement. An example of such an implement is a rotary cutter where the working element(s) is one or more cutterblades.

A common practice with rotary cutters is to provide a leveling assembly including a pair of leveling rods having forward ends coupled to the draft tongue of the cutter and having rearward ends connected to a rear axle to which the ground wheels are mounted, the axle being selectively pivoted by a hydraulic actuator to change the cutting height. Each of these rods must be adjusted separately to level the cutter from front to back for varying cutter heights. Since each rod is separate, it is almost impossible to adjust them evenly which results in all the load being transferred through one rod. This requires both rods to be over-designed to accommodate the full tensile load.

SUMMARY OF THE INVENTION

According to the present invention there is provided an improved leveling assembly for a towed implement and more specifically there is provided an improved leveling assembly utilizing a pair of leveling rods.

An object of the invention is to provide a leveling assembly for a towed implement comprising a pair of leveling rods which are mounted such that they are always loaded equally during operation.

A more specific object of the invention is to provide a leveling assembly as set forth in the previous object wherein the leveling rods are connected to each other through an equalizer bar which acts to equalize the loads carried by the two rods.

Yet another object of the invention is to provide a leveling assembly for a towed implement comprising a pair of rods mounted such that the implement may be leveled from front to rear by an adjustment carried by only one of the rods.

These and other objects will become apparent from a reading of the ensuing description together with the appended drawings.

BRIEF DESCRIPTION OF THE DRAWINGS

FIG. 3 is an enlarged, right side elevational view of the cutter, but showing only the left-hand leveling rod.

FIG. 4 is a view like that of FIG. 3, but showing only the right-hand leveling rod.

DESCRIPTION OF THE PREFERRED EMBODIMENT

Figure 1:
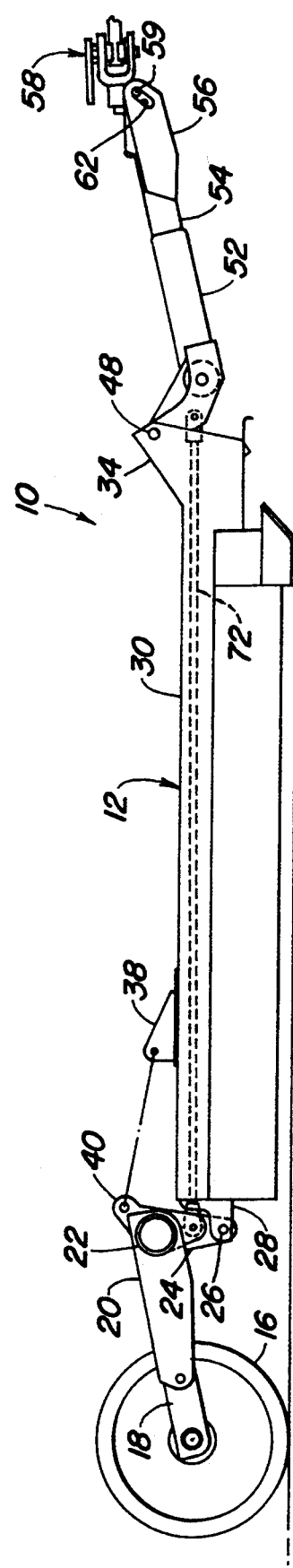
FIG. 1 is a right side elevational view of a towed rotary cutter embodying a leveling rod assembly.
Figure 2:
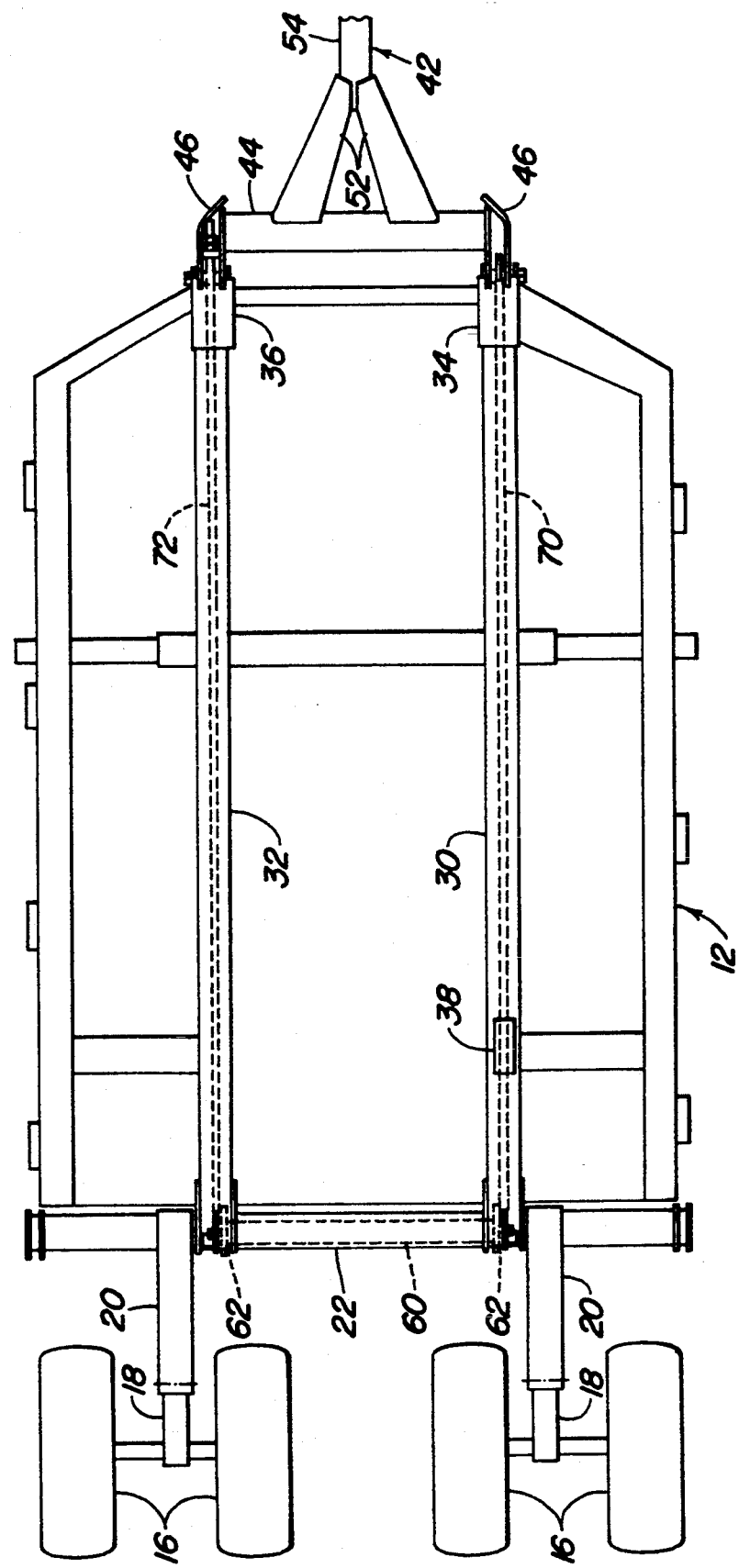
FIG. 2 is a top plan view of the rotary cutter shown in FIG. 1.

Referring now to FIG. 1, there is shown a towed implement, specifically, a rotary cutter 10, except that the cutter blades and drive train therefor have been omitted for simplicity. The cutter 10 includes a main frame defined by a blade housing or deck 12 supported at opposite side of its forward end by respective wear shoes 14 (only one shown) and supported at its rear by two pairs of ground wheels 16. Each pair of ground wheels 16 is mounted to the rear end of an arm 18 that is positioned between the legs of, and pivotally attached to, a main channel-like arm 20. Suspension springs, not shown, act between the arms 18 and 20 and yieldably bias the arms 18 downwardly. The arms 20 are fixed to a tubular wheel axle 22 having downwardly projecting lugs 24, each being respectively received between and pivotally mounted, as at pins 26, to respective transversely spaced pairs of rearward projections 28 of the housing 12. The pairs of projections 28 each form a rearward extension of a respective one of right and left fore-and-aft extending stiffening members 30 and 32, respectively. The stiffening members 30 and 32 are each in the form of an inverted u-shaped channel having its legs welded to the housing top. Generally triangular, forwardly opening u-shaped hitch supports 34 and 36, respectively, are integral with and form forward extensions of the stiffening members 30 and 32. A lift cylinder (not shown) is mounted between a bracket 38, integral with the top of the right-hand stiffening member 30, and an ear 40 integral with and projecting upwardly from the wheel axle 22. A draft hitch or tongue 42 includes a cylindrical tubular cross member 44 having plate assemblies 46 welded across each end, the plate assemblies each including inner and outer plates having spaced apart parallel upwardly and rearwardly extending portions joined at their upper ends by a bushing (not shown) welded therebetween. A pin 48 is received in a cylindrical bushing 50 located in an upper forward location of each of the hitch supports 34 and 36 and projects into the associated bushing of a respective one of the plate assemblies 46 so as to establish a pivotal connection of the hitch or tongue 42 with the housing 12. The hitch 42 is further defined by a pair of forwardly converging members 52 having their rearward ends fixed to the cross member 44 at laterally spaced locations and having their forward ends fixed to opposite sides of a centrally located, fore-and-aft extending square tubular member 54 (FIG. 2). A pair of vertical plates 56, only one shown, are welded to opposite faces of and form a forward extension of the member 54. A clevis assembly 58 is attached to the plates 56 by a pin 59 that is received in transversely aligned openings 62 provided in the plates and in a transverse crossbore provided in the clevis assembly.

A leveling rod assembly is mounted between the hitch 42 and the wheel axle 22 for maintaining the housing 12 and, hence, the cutter blade (not shown) carried thereby in a level attitude relative to the ground as when the lift cylinder is actuated for adjusting cutting height, for example. Specifically, the leveling rod assembly includes a cylindrical equalizer bar 60 extending between and pivotally mounted in a pair of transversely spaced ears 62 joined to and projecting downwardly from the wheel axle 22 at locations spaced slightly inwardly from fore-and-aft centerlines respectively of the stiffener members 30 and 32. As can best be seen in FIGS. 3 and 4, right and left hand ends of the equalizer bar 60 are respectively defined by outwardly projecting right and left connection pins 66 and 68, the pins being disposed below and above, and thus eccentric to, the axis of rotation of the equalizer bar. Right and left leveling rods 70 and 72, respectively, extend lengthwise through the stiffening members 30 and 32. The rear ends of the rods 70 and 72 are respectively defined by eyes 74 and 76 which are respectively received on the right and left connection pins 66 and 68. The front end of the right hand rod 70 is defined by an eye 78 received between the plates of the right hand plate assembly 46 and pinned, as at 80, below the connection 48,50 between the assembly 46 and the right hand hitch support 34. The left hand rod 72 has a forward end slidably received in a swivel member 82 that is received between and pivotally connected, as at 84, to the plates of the left hand plate assembly 46. The forward end of the left hand rod 72 is threaded and received thereon are adjustment and jam nuts 86 and 87, respectively, which are operative to effect adjustment of the rods 70 and 72 and hence height adjustment of the hitch 42 for hook-up to drawbars of different heights, or for the implement once it is coupled to a drawbar. Specifically, lengthening of the effective length of the left hand rod 72 will result in the hitch 42 being raised, if the latter is not already coupled to a drawbar and will result in the front of the implement being lowered, if the hitch 42 is coupled to a drawbar. On the other hand, shortening of the effective length of the rod 72 will result in the hitch 42 being lowered or the front of the implement being raised. While the threaded rod end and adjustment and jam nuts is a preferred length adjustment means, a turnbuckle type of length adjustment could be used instead.

The equalizer bar 60 makes it possible to effect adjustment by adjusting only one of the rods 70 and 72. It is here noted that while the equalizer bar 60 is mounted to the axle 22 at the rear of the implement 10, it could just as well be mounted to the hitch 42 at the front of the implement. The rod 72 would then be reversed so that adjustment would be done at the rear of the implement. An equalizer bar could be provided at both ends of the rod, but if this were done the ability to adjust the level by adjusting only one rod would be lost and an adjustment such as a turnbuckle would have to be provided in both rods. A further function of the bar 60 is to ensure that both of the rods 70 and 72 will carry the same load. This allows the rods to be designed for sharing the load instead of having to be designed for carrying all of the load as is required with known designs. This function of the equalizer bar would be maintained even if equalizer bars were provided at both ends of the rods.

We claim:

1. In an implement including a main central frame, a wheel axle mounted to a rear location of the frame for pivotal movement about a first horizontal transverse axis, wheels being mounted to the wheel axle and moveable vertically relative to the frame to effect raising and lowering of the frame, a hitch mounted to a front location of the frame for pivotal movement about a second horizontal transverse axis, a clevis having an articulated connection with a forward end of the hitch and being adapted for connection to the drawbar of a towing vehicle, and a pair of parallel transversely spaced leveling rods connected between the wheel axle and the hitch for maintaining the frame level as the frame is raised and lowered by vertical movement of the wheels relative to the frame when the clevis is coupled to the drawbar of a towing vehicle, the improvement comprising: an equalizer member extending between said first and second leveling rods and being pivotally mounted to one of said wheel axle and said hitch for movement about a third horizontal transverse axis; and an end of each of said pair of leveling rods being pivotally coupled to said equalizer member at respective locations offset radially in different directions from said third axis, whereby the equalizer member will act to equalize forces imposed on the leveling rods as the implement is towed over the terrain.

2. The implement as defined in claim 1 wherein the equalizer member is in the form of an elongate cylindrical bar mounted to said one of said wheel axle and said hitch for pivoting about said third axis; said cylindrical bar having first and second connection pins respectively formed integrally with opposite ends of said bar at respective locations offset radially in different directions from said third axis; and said leveling rods each having an eye received on a respective one of the connection pins.

3. The implement as defined in claim 2 wherein one of the leveling rods includes an adjustment means for effecting a change in its effective length extending between the wheel axle and the hitch to thereby effect changes in the height of the hitch for coupling to towing vehicles having drawbars at different heights.

4. The implement as defined in claim 1 wherein one of the leveling rods includes an adjustment means for effecting a change in its effective length extending between the wheel axle and said hitch to thereby effect changes in the height of the hitch for coupling to towing vehicles having drawbars at different heights.

5. The implement defined in claim 4 wherein the adjustment means comprises said one of the leveling rods having an end, opposite that attached to said one of the wheel axle and said hitch, which is threaded; the said one of the leveling rods being slidably received in a swivel member pivotally coupled to said one of said wheel axle and said hitch; and adjustment and jam nuts being received on the threaded end of said one of the leveling rods.

6. The implement as defined in claim 1 wherein the equalizer member is mounted to the wheel axle.

* * * * *